(12) United States Patent
Young (10) Patent No.: US 10,019,579 B2
(45) Date of Patent: Jul. 10, 2018

(54) EMBEDDED CONTROLLER FOR SAFETY BOOTING AND METHOD THEREOF

(71) Applicant: INSYDE SOFTWARE CORP., Taipei (TW)

(72) Inventor: Hermann Young, Taipei (TW)

(73) Assignee: INSYDE SOFTWARE CORP., Taipei (TW)

( * ) Notice: Subject to any disclaimer, the term of this patent is extended or adjusted under 35 U.S.C. 154(b) by 86 days.

(21) Appl. No.: 15/158,195

(22) Filed: May 18, 2016

(65) Prior Publication Data

US 2016/0350538 A1    Dec. 1, 2016

(30) Foreign Application Priority Data

May 25, 2015  (TW) .............................. 104116717 A (51) Int. Cl.
| | |
|---|---|
| *G06F 15/177* | (2006.01) |
| *G06F 9/00* | (2006.01) |
| *G06F 21/57* | (2013.01) |
| *G06F 9/4401* | (2018.01) |
| *G06F 1/26* | (2006.01) |
| *G06F 8/65* | (2018.01) |
| *G06F 11/14* | (2006.01) |

(52) U.S. Cl.
CPC .............. *G06F 21/575* (2013.01); *G06F 1/26* (2013.01); *G06F 9/4406* (2013.01); *G06F 8/66* (2013.01); *G06F 11/1417* (2013.01); *G06F 21/572* (2013.01); *G06F 2211/1097* (2013.01)

(58) Field of Classification Search
CPC .. G06F 21/575; G06F 21/572; G06F 11/1417; G06F 8/66; G06F 2211/1097
See application file for complete search history.

(56) References Cited

U.S. PATENT DOCUMENTS

| | | | |
|---|---|---|---|
| 7,017,038 B1 * | 3/2006 | LaChance | G06F 9/4403 713/2 |
| 7,424,398 B2 * | 9/2008 | Booth | G06F 21/575 702/186 |
| 2012/0106319 A1 * | 5/2012 | Staring | H04L 69/26 370/216 |

* cited by examiner

*Primary Examiner* — Xuxing Chen
(74) *Attorney, Agent, or Firm* — Rabin & Berdo, P.C.

(57) ABSTRACT

A safety booting method for an embedded controller is applied in a laptop. The embedded controller is installed in the laptop, and the laptop includes a central processor unit (CPU). The safety booting method for the embedded controller includes steps of: connecting the embedded controller with a power; determining whether a safety verification for a booting read only memory (ROM) is passed or not; and initializing the power of the laptop by the embedded controller to normally provide the power to the laptop and boot the laptop when the safety verification for the booting ROM is passed.

10 Claims, 7 Drawing Sheets

EMBEDDED CONTROLLER FOR SAFETY BOOTING AND METHOD THEREOF

CROSS-REFERENCE TO RELATED APPLICATIONS

This application claims the benefit of Taiwan patent application No. 104116717, filed on May 25, 2015, the disclosure of which is incorporated herein in its entirety by reference.

BACKGROUND OF THE INVENTION

1. Field of the Invention

The present invention relates to an embedded controller for safety booting and method thereof, and more particularly to an embedded controller for safety booting and method thereof to determine whether a safety verification of a booting read only memory (ROM) is passed or not.

2. Description of Related Art

Since computer information technology is well developed, the problems of information security, such as computer data leakage of personal information and even the safety of personal assets, will occur. Therefore, the computer information safety is concerned by the public. Generally, in order to avoid the information safety problem that a third party installs a booting ROM in a laptop, a current solution is to install a controller in a chipset (such as north bridge chipset or south bridge chipset) within the laptop. The controller will analyze and determine whether the booting ROM is properly performing. If an invalid booting ROM is performed, the power of the laptop is cut off to stop the booting ROM of the third party or the invalid booting ROM. The booting ROM is a ROM within the laptop and the ROM saves all the data and related information, such as BIOS code of basic input and output system, related to a booting procedure. Those data won't vanish when the power is turned off. The booting ROM has a control authorization for the basic input and output system (BIOS) when the laptop is turned on.

However, the drawback of the aforementioned technique is that only some of the specific chipsets, instead of all of the chipsets, include certain control functions. When some of the chipsets do not support such functions, the effect of the safety booting is questionable.

SUMMARY OF THE INVENTION

A main objective of the present invention is to provide an embedded controller for safety booting and a method thereof. Before a booting ROM of the laptop is executed, the embedded controller determines whether a safety verification of the booting ROM is passed or not. If the safety verification is not passed, the power of the laptop is cut off to stop booting so as to solve information security problem of the laptop.

In order to achieve the aforementioned purpose in the present invention, a safety booting method for an embedded controller is disclosed in the present invention. The safety booting method for an embedded controller is executed by the embedded controller. The embedded controller is installed in a laptop, and the laptop includes a central processor unit (CPU). The safety booting method for the embedded controller comprises steps of: connecting the embedded controller with a power; determining whether a safety verification of a booting read only memory (ROM) is passed or not; and initializing the power of the laptop by the embedded controller to normally provide the power to the laptop and boot the laptop when the safety verification for the booting ROM is passed.

According to the safety booting method for the embedded controller, the method further comprises a step of keeping the laptop in a power-off mode by the embedded controller and stopping booting the laptop when the safety verification for the booting ROM is not passed.

According to the safety booting method for the embedded controller, the step of determining whether the safety verification for the booting ROM is passed or not is to determine whether a checksum in all or some blocks within the booting ROM is correct or not.

According to the safety booting method for the embedded controller, the step of determining whether the safety verification for the booting ROM is passed or not is to determine whether a signature verification in a certain block within the booting ROM is correct or not.

According to the safety booting method for the embedded controller, the step of determining whether the safety verification for the booting ROM is passed or not is to determine whether content in a certain block within the booting ROM is valid or not.

According to the safety booting method for the embedded controller, the step of determining whether the checksum is correct or not includes steps of: calculating a first value in accordance with a packet of a ROM block; transmitting the first value and the packet together; receiving the packet at a receiving end; calculating a second value in accordance with the received packet; determining whether the second value and the first value are the same or not; determining the packet at the receiving end is correct when the second value and the first value are the same; and determining the packet at the receiving end is incorrect when the second value and the first value are different.

In order to achieve the aforementioned purpose in the present invention, an embedded controller for safety booting is disclosed in the present invention, and the embedded controller for safety booting is installed within a laptop and the laptop includes a CPU. The embedded controller for safety booting comprises an embedded controller processor, a memory unit, a nonvolatile storage unit and a connecting interface. The memory unit is electrically connected with the embedded controller processor and is configured to store data. The nonvolatile storage unit is electrically connected with the embedded controller processor and is configured to store a safety booting firmware. One end of the connecting interface is electrically connected with a computer bus of the embedded controller processor and another end thereof is electrically connected with an embedded system bus of the laptop. The safety booting firmware determines whether a safety verification for a booting ROM in the laptop is passed or not when the embedded controller for safety booting is connected with a power. If the safety verification is passed, the laptop is booting.

According to the embedded controller for safety booting, the laptop includes a ROM and a RAM. The ROM is electrically connected with the CPU and the connecting interface, and is configured to store booting data of the laptop. The RAM is electrically connected with the CPU and is configured to be system memory of the laptop. The embedded system bus is electrically connected with the CPU and configured to be an input/output (I/O) interface of the CPU. The safety booting firmware determines whether a safety verification for a booting ROM in the laptop is passed or not.

In order to achieve the aforementioned purpose in the present invention, a baseboard management controller for safety booting is disclosed herein. The baseboard management controller is installed within a laptop and the laptop includes a CPU, and the baseboard management controller for safety booting comprises a baseboard management processor, a memory unit, a nonvolatile storage unit, and a connecting interface. The memory unit is electrically connected with the baseboard management processor and configured to store data. The nonvolatile storage unit is electrically connected with the baseboard management processor and configured to store a safety booting firmware. One end of the connecting interface electrically is connected with a computer bus of the baseboard management processor and another end thereof is electrically connected with an embedded system bus of the laptop. The safety booting firmware determines whether a safety verification for a booting ROM in the laptop is passed or not when the embedded controller for safety booting is connected with a power. If the safety verification is passed, the laptop is booting.

According to the baseboard management controller for safety booting, the laptop includes a ROM and a RAM. The ROM is electrically connected with the CPU and the connecting interface, and is configured to store booting data of the laptop. The RAM is electrically connected with the CPU and configured to be system memory of the laptop. The embedded system bus is electrically connected with the CPU and configured to be an input/output (I/O) interface of the CPU. The safety booting firmware determines whether a safety verification for a booting ROM in the laptop is passed or not.

DETAILED DESCRIPTION OF THE PREFERRED EMBODIMENT

These and other aspects of the embodiments herein will be better appreciated and understood when considered in conjunction with the following description and the accompanying drawings.

An embedded controller for safety booting and method thereof are provided in the present invention and the embedded controller and the method thereof are preferably used in a laptop. Normally, the laptop includes an embedded controller (EC) and the embedded controller is a chip firstly executed in the laptop. One of the functions of the embedded controller is to perform power control before booting an operation system (OS) in the laptop. When the laptop is connected with a power or is turned on by a battery thereof and a user has not pushed a power button on the laptop, the embedded controller has already worked functionally. Therefore, a safety checking of a booting ROM can be executed.

The booting ROM is a ROM in the laptop for storing all the data and related information for a booting procedure, such as a BIOS code of a basic input and output system. Those information and data won't vanish when the power is turned off. The booting ROM includes a control authorization of the basic input and output system when the laptop is turned on.

Figure 1:
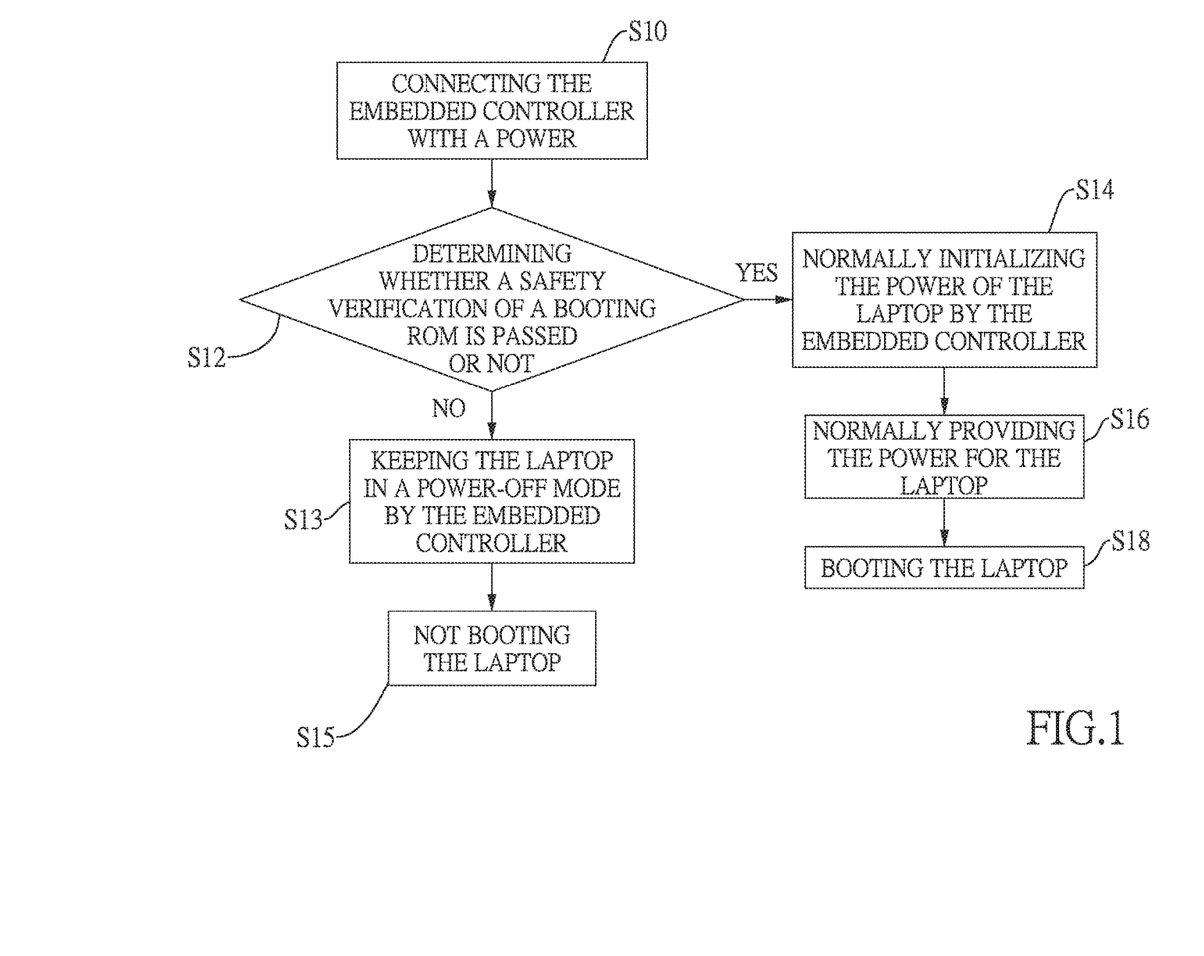
FIG. 1 is a flowchart of a first embodiment in the present invention.

FIG. 1 is a flowchart of a first embodiment of the method in the present invention. The method includes the following steps. In step S10, the embedded controller is connected with a power. In step S12, the booting ROM is determined whether a safety verification thereof is passed or not. In step S14, if the safety verification for the booting ROM is passed, a power initialization of the laptop is completed by the embedded controller. In step S16, the power is normally provided in the laptop. In step S18, a booting procedure for the laptop is performed. In step S13, if the safety verification for the booting ROM is not passed, the embedded controller keeps the laptop in a power-off mode. In step S15, the booting of the laptop is not performed. According to the aforementioned method, when the embedded controller is connected with the power, the laptop is determined whether the safety verification for the booting ROM is passed or not. If the safety verification is passed, the laptop performs the booting procedure. If the safety verification is not passed, the booting of the laptop is not performed.

Connecting the laptop with the power is that the laptop is connected with the power via a power wire or the laptop is turned on by the power of the battery. When the user does not push the power button, the embedded controller can perform some basic operations. The power initialization is that a management setting in a power initialization status when the laptop is booting. The power-off mode is that the laptop is powered-off.

The aforementioned safety verification manner in step S12 includes, but is not limited to: 1. determining if checksums in all or some blocks of the booting ROM is correct or not; 2. determining if a signature verification in a certain block of the booting ROM is correct or not; 3. determining if content in a certain block of the booting ROM is valid or not. The aforementioned three examples are respectively corresponding to the embodiments of the flowcharts in FIG. 2-FIG. 4.

Figure 2:
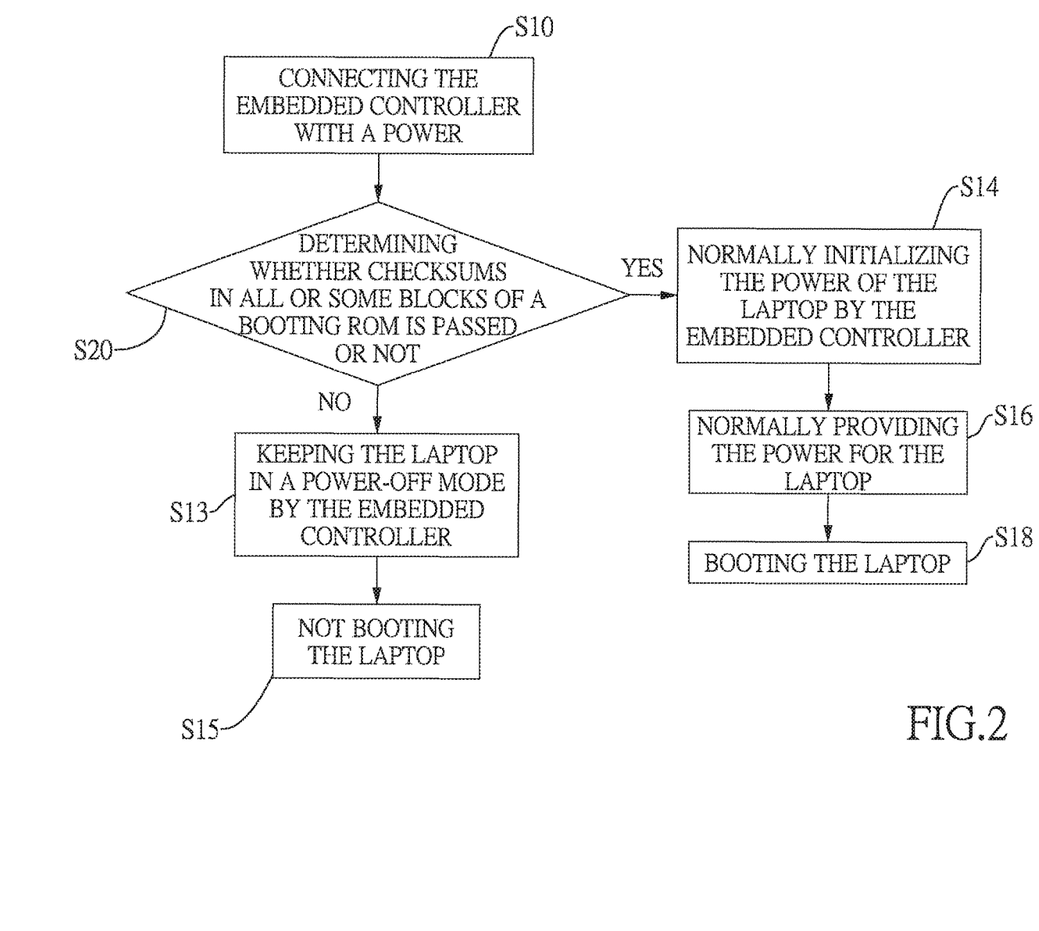
FIG. 2 is flowchart of a second embodiment in the present invention.

FIG. 2 is the method of the second embodiment of the present invention. The method includes the following steps. In step S10, the embedded controller is connected with the power. In step S20, the booting ROM is determined whether the checksums in all or some blocks are correct or not. If the checksums are correct, the power initialization of the laptop is normally performed by the embedded controller. In step S16, the power is normally provided in the laptop. In step S18, the booting procedure for the laptop is performed. In step S13, if the checksums are not correct, the embedded controller keeps the laptop in the power-off mode. In step S15, the booting of the laptop is not performed.

Figure 3:
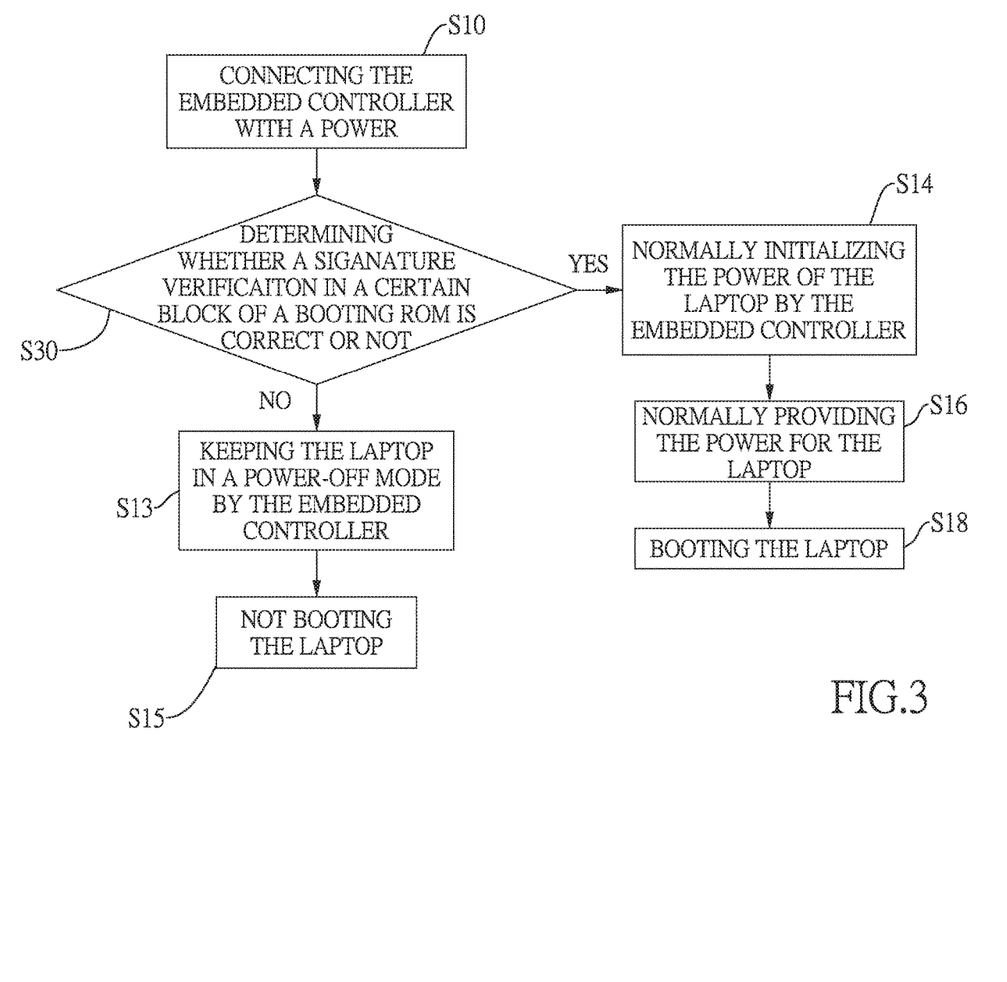
FIG. 3 is a flowchart of a third embodiment in the present invention.

FIG. 3 is the method in the third embodiment of the present invention. The method includes the following steps. In step S10, the embedded controller is connected with the power. In step S30, the booting ROM is determined whether the signature verification in a certain block is correct or not. In step S14, if the signature verification in the certain block is correct, the embedded controller normally performs the power initialization of the laptop. In step S16, the power is normally provided in the laptop. In step S18, the booting procedure for the laptop is performed. In step S13, if the signature verification in the certain block is not correct, the embedded controller keeps the laptop in the power-off mode. In step S15, the booting of the laptop is not performed. The aforementioned signature verification is to verify the signature data of block address saved in the booting ROM is correct or not. For example, a number code corresponding to an offset value of a signature is verified to be correct or not and used for the safety verification.

Figure 4:
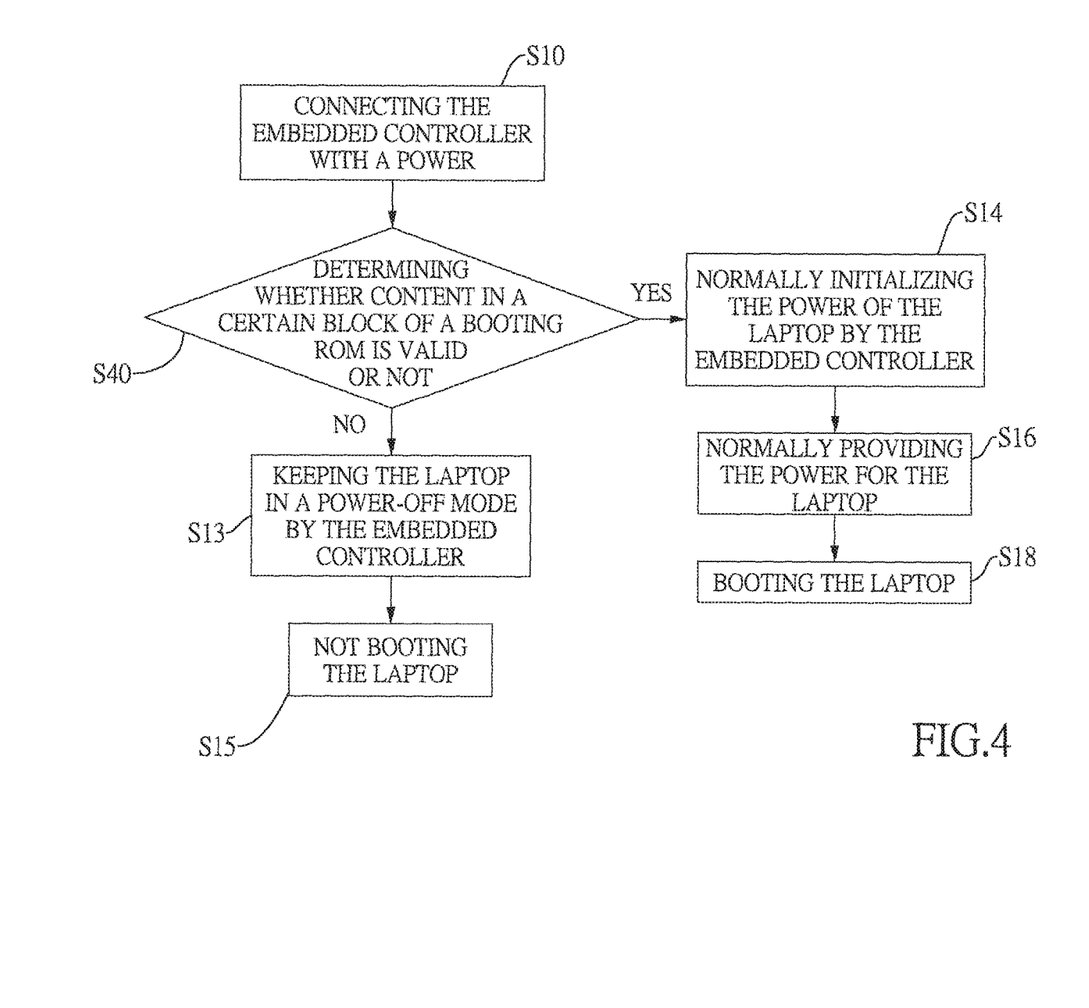
FIG. 4 is a flowchart of a fourth embodiment in the present invention.

FIG. 4 is the method in the fourth embodiment of the present invention. The method includes the following steps. In step S10, the embedded controller is connected with the power. In step S40, the booting ROM is determined whether content in a certain block is valid or not. In step S14, if the content in the certain block is correct, the embedded controller normally performs the power initialization of the laptop. In step S16, the power is normally provided in the laptop. In step S18, the booting procedure for the laptop is performed. In step S13, if the content in the certain block is not correct, the embedded controller keeps the laptop in the power-off mode. In step S15, the booting of the laptop is not performed. The step to determine the content in the certain block of the booting ROM is valid or not is to determine, for example, whether the content of a table in the certain block is valid or not. The content may be a company name, a manufacture date or a serial number of an integrated chip (IC), and is used for the safety verification.

Figure 5:
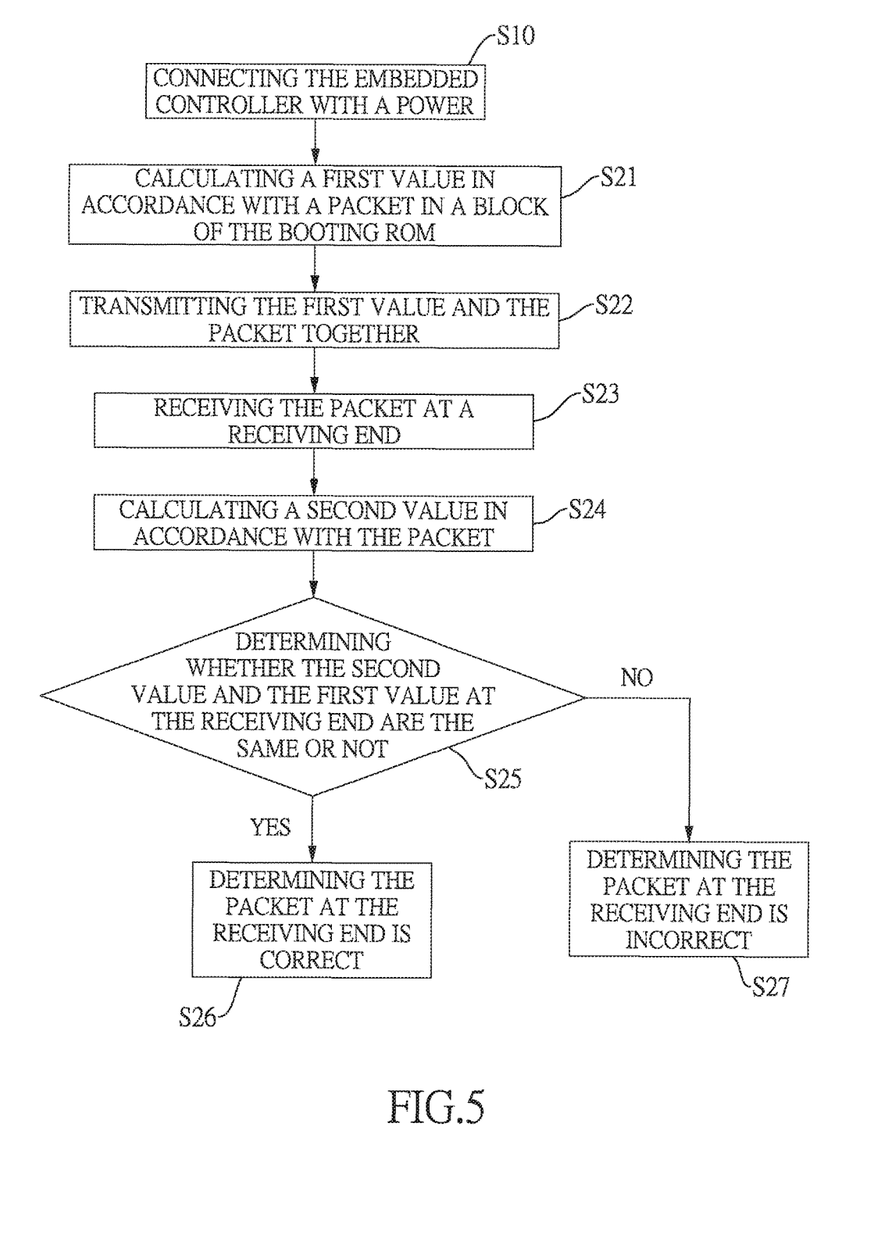
FIG. 5 is a flowchart to determine whether the checksum is correct or not in the second embodiment of the present invention.

The aforementioned checksum in the second embodiment is a small-size datum within a digital data block and used to determine integrity of the transmitted data. The checksum belongs to a formation of a redundancy check. Through an error detection method, for digital signals, the data is transmitted via a communication transmission manner and received at a receiving end corresponding to a transmitting end so as to perform a complete data determination. As shown in FIG. 5, the method includes the following steps. In step S10, the embedded controller is connected with the power. In step S21, a first value is calculated in accordance with a data in a block of the booting ROM. In step S22, the value is transmitted with a packet. In step S23, the packet is received at the receiving end. In step S24, a second value is calculated in accordance with the content of the packet. In step S25, it is to determine whether the first value and the second value are the same or not. If the first value and the second value are the same, in step S26, the packet received at the receiving end is correct. If the first value and the second value are different, in step S27, the packet received at the receiving end is incorrect. By the determination and the verification, the embedded controller in the present invention can determine whether the safety verification for the booting ROM is passed or not to make sure the laptop will not be turned on by the third party or maliciously turned on.

Figure 6:
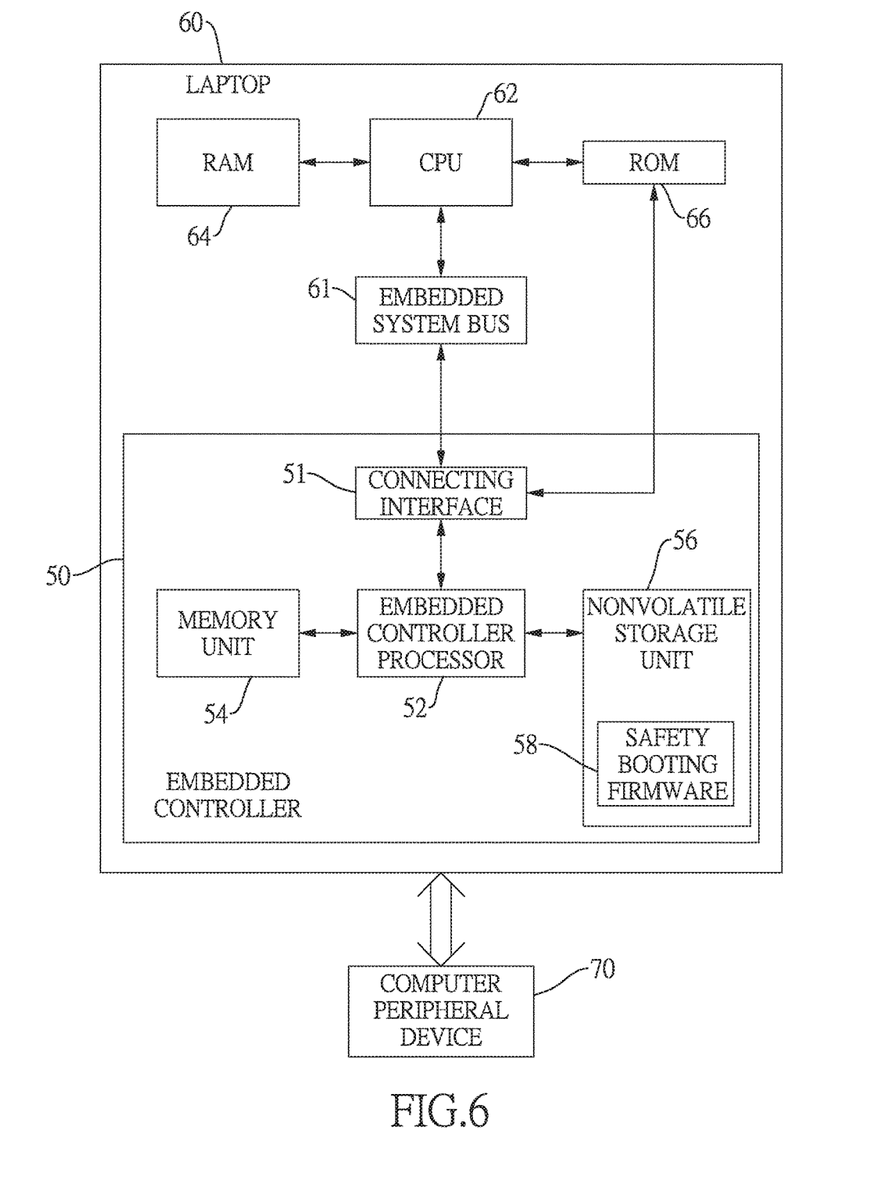
FIG. 6 is a block diagram of the first embodiment in the present invention.

A laptop 60 and a computer peripheral device 70 are shown in FIG. 6 and the laptop 60 includes an embedded controller 50 for safety booting. The embedded controller 50 includes an embedded controller processor 52, a memory unit 54, a nonvolatile storage unit 56, a safety booting firmware 58, and a connecting interface 51.

One end of the connecting interface 51 is connected with a computer bus within the embedded controller processor 52 of the embedding controller 50 and the other end of the connecting interface 51 is connected with an embedded system bus 61. The embedded controller processor 52 of the embedded controller 50 is a calculating core of the embedded controller 50. The memory unit 54 is connected with the embedded controller processor 52 of the embedded controller 50 for storing data. The nonvolatile storage unit 56 is connected with the embedded controller processor 52 of the embedded controller 50 for storing the safety booting firmware 58. The safety booting firmware 58 is the program to perform the method shown in the flowcharts of FIG. 1 to FIG. 4. By the safety booting firmware 58, when the embedded controller 50 is connected with the power, the safety verification for the booting ROM in the laptop is determined to be passed or not. If the safety verification is passed, the booting of the laptop is performed. If the safety verification is not passed, the booting of the laptop is not performed.

In addition, the device with the embedded controller 50 for safety booting is connected with a computer peripheral device 70 and the computer peripheral device 70 may be a keyboard, a mouse or a device connected with the computer bus of the embedded controller 50.

The laptop 60 includes a CPU 62, a random access memory (RAM) 64, a ROM 66 and an embedded system bus 61. The CPU 62 is a calculating core of the laptop 60. The ROM 66 is electrically connected with the CPU 62 and the connecting interface 51, and is configured to store booting data of the laptop 60. The RAM 64 is electrically connected with the CPU 62 and is a system memory of the laptop 60. The embedded system bus 61 is electrically connected with the CPU 62 and used as an input/output (I/O) interface of the CPU 62.

The embedded system bus 61 of the laptop 60, practically, includes an I/O host controller and is configured to control signal input and output in the laptop 60. The embedded system bus 61 also includes a PCI bus electrically connected with the I/O host controller to be the bus for signal transmission.

Figure 7:
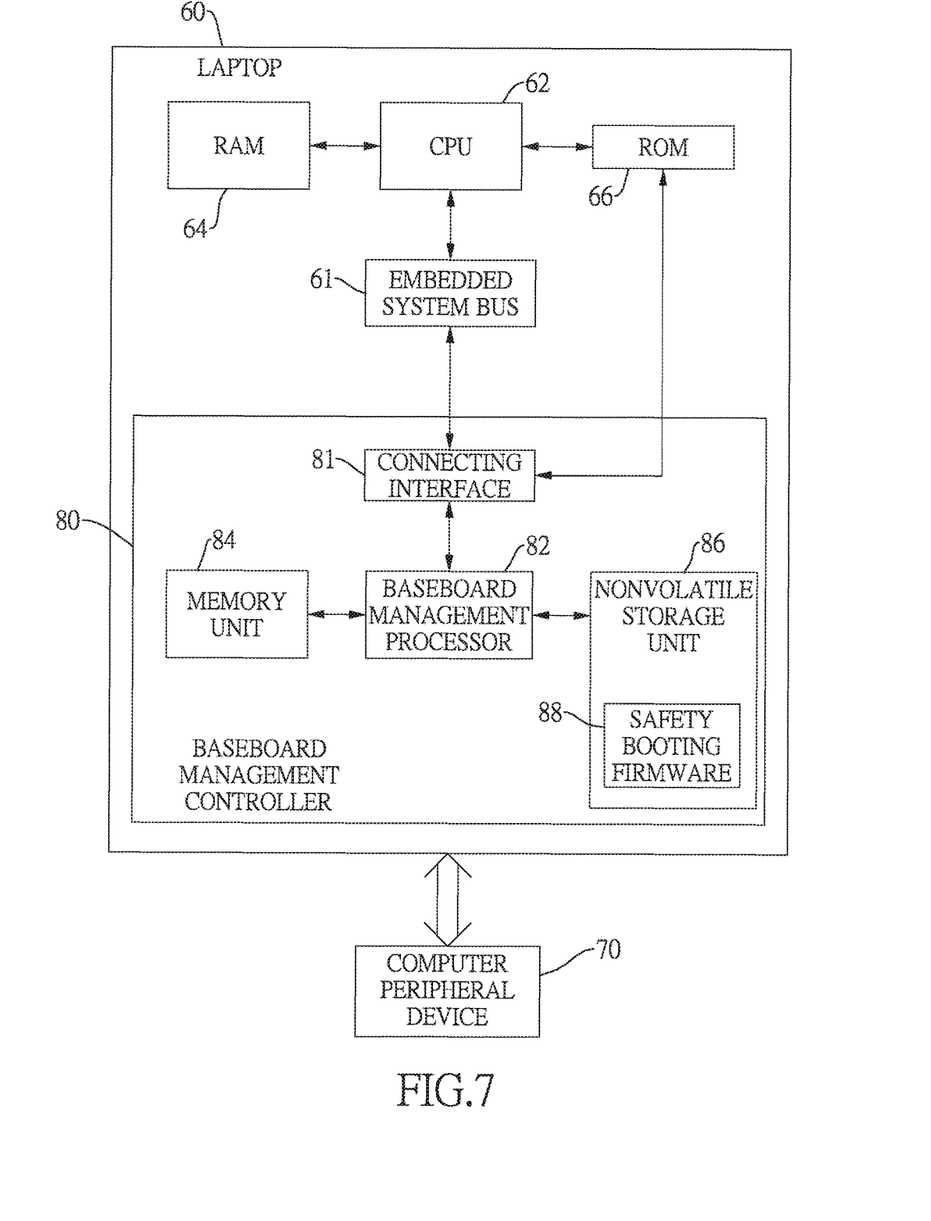
FIG. 7 is a block diagram of the second embodiment in the present invention.

FIG. 7 is the second embodiment of the laptop with the embedded controller. The difference between the first embodiment and the second embodiment is that the embedded controller for safety booting is a baseboard management controller (BMC) 80 in the second embodiment. The baseboard management controller 80 includes a baseboard management processor 82, a memory unit 84, a nonvolatile storage unit 86, a safety booting firmware 88 and a connecting interface 81. Similarly, the baseboard management processor 82 is the calculating core of the baseboard management controller 80. The memory unit 84 is electrically connected with the baseboard management processor 82 and is configured to store data. The nonvolatile storage unit 86 is electrically connected with the baseboard management processor 82 for storing the safety booting firmware 88. The safety booting firmware 88 is to perform the programs of the method shown in the embodiment of FIG. 1 to FIG. 4. When the baseboard management controller 80 is connected with the power, the laptop is determined whether the safety verification for the booting ROM is passed or not. If the safety verification is passed, the laptop performs the booting procedure. One end of the connecting interface 81 is connected with the computer bus of the baseboard management processor 82. Another end of the connecting interface 81 is connected with the embedded system bus 61 and the other end of the connecting interface 81 is connected with the ROM 66. In addition, the laptop 60 with the baseboard management controller 80 is electrically connected with the computer peripheral device 70 and the computer peripheral device 70 may be a keyboard, a mouse and a device connected with the computer bus of the embedded controller 80.

The baseboard management controller (BMC) 80 for safety booting is used to monitor a variation of physical parameters within the laptop 60. The physical parameters monitored by the BMC 80 includes temperature, humidity, voltage value of the power, speed of a fan, communication parameter or operating system (OS) function and so on. When one of the physical parameters is abnormal, the BMC 80 stops the laptop 60 from booting.

In summary, in the present invention, before the booting ROM of the laptop is executed, the embedded controller 50 determines whether the safety verification for the booting ROM is passed or not. If the safety verification is not passed, the laptop is powered off to prevent installation of a third party booting ROM or a malware ROM booting the laptop. The present invention may efficiently solve the information security problem of the laptop.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A safety booting method for an embedded controller installed in a laptop, the laptop including a central processor unit (CPU), and the safety booting method being executed by the embedded controller and comprising steps of:
    connecting the embedded controller with a power;
    controlling the laptop in a power-off mode by the embedded controller before determining whether a safety verification for a booting read only memory (ROM) is passed or not; and
    initializing a power of the laptop by the embedded controller to normally provide the initialized power to the laptop and boot the laptop when the safety verification for the booting ROM is passed.

2. The safety booting method for the embedded controller as claimed in claim 1, further comprising:
    keeping the laptop in the power-off mode by the embedded controller and stopping booting the laptop when the safety verification for the booting ROM is not passed.

3. The safety booting method for the embedded controller as claimed in claim 1, wherein the step of determining whether the safety verification for the booting ROM is passed or not is to determine whether a checksum in all or some blocks within the booting ROM is correct or not.

4. The safety booting method for the embedded controller as claimed in claim 1, wherein the step of determining whether the safety verification for the booting ROM is passed or not is to determine whether a signature verification in a certain block within the booting ROM is correct or not.

5. The safety booting method for the embedded controller as claimed in claim 1, wherein the step of determining whether the safety verification for the booting ROM is passed or not is to determine whether content in a certain block within the booting ROM is valid or not.

6. The safety booting method for the embedded controller as claimed in claim 3, wherein the step of determining whether the checksum is correct or not includes steps of:
    calculating a first value in accordance with a packet in a block of the booting ROM;
    transmitting the first value and the packet together;
    receiving the packet at a receiving end;
    calculating a second value in accordance with the received packet;
    determining whether the second value and the first value are the same or not;
    determining the packet at the receiving end is correct when the second value and the first value are the same; and
    determining the packet at the receiving end is incorrect when the second value and the first value are different.

7. An embedded controller for safety booting installed within a laptop, the laptop including a CPU, and the embedded controller for safety booting comprising:
    an embedded controller processor;
    a memory unit electrically connected with the embedded controller processor and configured to store data;
    a nonvolatile storage unit electrically connected with the embedded controller processor and configured to store a safety booting firmware; and
    a connecting interface having one end electrically connected with a computer bus of the embedded controller processor and having another end electrically connected with an embedded system bus of the laptop;
    wherein the safety booting firmware controls the laptop in a power-off mode before the safety booting firmware determines whether a safety verification for a booting ROM in the laptop is passed or not when the embedded controller for safety booting is connected with a power; and
    if the safety verification is passed, the laptop is booted.

8. The embedded controller as claimed in claim 7, wherein the laptop includes:
    a ROM electrically connected with the CPU and the connecting interface and configured to store booting data of the laptop; and
    a random access memory (RAM) electrically connected with the CPU and configured to be a system memory of the laptop;
    wherein the embedded system bus is electrically connected with the CPU and configured to be an input/output (I/O) interface of the CPU; and
    the safety booting firmware determines whether the safety verification for the booting ROM in the laptop is passed or not.

9. A baseboard management controller for safety booting installed within a laptop, the laptop including a CPU, and the baseboard management controller for safety booting comprising:
    a baseboard management processor;
    a memory unit electrically connected with the baseboard management processor and configured to store data;
    a nonvolatile storage unit electrically connected with the baseboard management processor and configured to store a safety booting firmware; and
    a connecting interface having one end electrically connected with a computer bus of the baseboard management processor and having another end electrically connected with an embedded system bus of the laptop;
    wherein the safety booting firmware controls the laptop in a power-off mode before the safety booting firmware determines whether a safety verification for a booting ROM in the laptop is passed or not when the embedded controller for safety booting is connected with a power; and
    if the safety verification is passed, the laptop is booted.

10. The baseboard management controller for safety booting as claimed in claim 9, wherein the laptop includes:

a ROM electrically connected with the CPU and the connecting interface and configured to store booting data of the laptop; and a RAM electrically connected with the CPU and configured to be system memory of the laptop;

wherein the embedded system bus is electrically connected with the CPU and configured to be an input/output (I/O) interface of the CPU; and the safety booting firmware determines whether a safety verification for a booting ROM in the laptop is passed or not.

* * * * *